(12) United States Patent
Kirilline et al.

(10) Patent No.: US 7,895,594 B2
(45) Date of Patent: Feb. 22, 2011

(54) VIRTUAL MACHINE EXTENDED CAPABILITIES USING APPLICATION CONTEXTS IN A RESOURCE-CONSTRAINED DEVICE

(75) Inventors: Viatcheslav Kirilline, St. Petersburg (RU); Howard D. Owens, Austin, TX (US); Valdimir Ivanov, St. Petersburg (RU); Vitaly Kozlovsky, St. Petersburg (RU)

(73) Assignee: Freescale Semiconductor, Inc., Austin, TX (US)

( * ) Notice: Subject to any disclaimer, the term of this patent is extended or adjusted under 35 U.S.C. 154(b) by 1608 days.

(21) Appl. No.: 11/091,575

(22) Filed: Mar. 28, 2005

(65) Prior Publication Data

US 2006/0218536 A1    Sep. 28, 2006

(51) Int. Cl.
G06F 9/455    (2006.01)
G06F 9/46    (2006.01)

(52) U.S. Cl. .................... 718/1; 718/104; 719/310; 719/328

(58) Field of Classification Search .............. 718/1
See application file for complete search history.

(56) References Cited

U.S. PATENT DOCUMENTS

| | | | | |
|---|---|---|---|---|
| 7,079,839 B1 * | 7/2006 | Papineau | ............ | 455/418 |
| 7,150,011 B2 * | 12/2006 | Ha et al. | ............ | 717/148 |
| 7,188,163 B2 * | 3/2007 | Srinivasan et al. | ............ | 709/221 |
| 7,216,160 B2 * | 5/2007 | Chintalapati et al. | ............ | 709/224 |
| 2002/0147611 A1 * | 10/2002 | Greene et al. | ............ | 705/1 |
| 2003/0005019 A1 * | 1/2003 | Pabla et al. | ............ | 709/1 |
| 2003/0014521 A1 * | 1/2003 | Elson et al. | ............ | 709/225 |
| 2005/0223101 A1 * | 10/2005 | Hayes, Jr. | ............ | 709/228 |

OTHER PUBLICATIONS

Beck et al, "MOCA: A Service Framework for Mobile Computing Devices", ACM, 1999, pp. 62-68.*
Ni et al, "Programming Ad-Hoc Netwroks of Mobile and Resource-Constrianed Devices", ACM, Jun. 2005, pp. 249-260.*

* cited by examiner

Primary Examiner—Lewis A Bullock, Jr.
Assistant Examiner—Jennifer N To
(74) Attorney, Agent, or Firm—Hamilton & Terrile, LLP; Kent B. Chambers

(57) ABSTRACT

Embodiments of the systems and methods utilize application contexts for extending virtual machines in a resource-constrained device to allow virtual machines to at least exercise scheduling control over platform independent applications and platform dependent native applications. Application contexts can be assigned to each application in the system. An application is represented by one or more data structures and functions. In one embodiment, an "application context" includes an interface to a virtual machine and a container for an execution environment of the application. The interface represents a mapping of services to an execution environment. The application context can isolate control over the execution of the application from the execution environment, thus, allowing the virtual machine to control execution of the application and allowing the application to be executed in a native environment, a virtual machine environment, or any other execution environment.

26 Claims, 7 Drawing Sheets

VIRTUAL MACHINE EXTENDED CAPABILITIES USING APPLICATION CONTEXTS IN A RESOURCE-CONSTRAINED DEVICE

BACKGROUND OF THE INVENTION

1. Field of the Invention

The present invention relates in general to the field of information processing, and more specifically to a system and method for extending virtual machines in a resource-constrained device using application contexts that allow virtual machines to exert control over a variety of applications, including native applications, and facilitate extending functionality of the virtual machines.

2. Description of the Related Art

For resource-constrained devices and other computers that employ an operating system, two traditional software layers exist: the operating system and the software programs (or "applications") that run on the operating system. A resource-constrained device is, for example, a device that has limited resources available for performing computing functions. For example, a resource-constrained device generally has limited memory, limited processing power, and/or limited graphical capabilities. Mobile phones, pagers, and personal digital assistants represent examples of resource-constrained devices. Software applications are programs used on a computer to accomplish particular desired tasks. An operating system is designed to function on a particular type of computer hardware, and an application is designed to run on a particular operating system (and processor). Such operating systems and applications are thus said to be "platform-specific". The platform specific applications are also commonly referred to as "native applications".

Platform-specific application programs are first written with a programming language to create a set of instructions called "source code." When writing source code for a platform-specific application, the developer must be mindful of the underlying operating system, in order to successfully invoke the operating system's application program interfaces (APIs). These API's essentially provide the vocabulary of the language understood by the operating system. If the source code of a platform-specific application is not written to accommodate the particular APIs of a given operating system, then the application will not run on that operating system. Thus, platform-specific applications are dependent on the specific operating system and hardware for which the application was designed and compiled.

Platform-independent applications utilize virtual machine technology, such as Sun Microsystem's Java™ technology, to significantly reduce the difficulty of producing applications for different operating system and hardware platforms. Platform-independent applications developed using the Java technology differ from traditional platform-dependent software in that the platform-independent applications need not interact directly with the specific operating system or hardware of a given computer. Java programs are compiled into an intermediate platform-independent representation called bytecode. At run-time, platform-independent applications typically interact with a Java virtual machine ("JVM"), which is an intermediate software layer that includes a programming language interpreter. The JVM interprets (i.e. translates) the Java-based program for the particular operating system and hardware platform that the Java virtual machine runs on. In essence, the Java-based program views the JVM as an operating system, and the operating system views the JVM as a traditional application.

The Mobile Information Device Profile (MIDP) is a set of Java APIs. The Connected Limited Device Configuration (CLDC) defines the base set of application programming interfaces and a virtual machine for resource-constrained devices such as mobile phones, pagers, and personal digital assistants. The Java virtual machine for resource-constrained devices intended to execute MIDlets is called the kJava Virtual Machine (KVM). Because, the KVM also interprets (i.e. translates) kJava-based programs for the particular operating system and hardware platform that the KVM runs on, the KVM can be considered as a virtual computer and an operating system (OS) from the perspective of kJava based programs. The CLDC combined with a profile such as the Mobile Information Device Profile (MIDP) provides a solid Java platform for developing applications to run on devices with limited memory, limited processing power, and limited graphical capabilities. Thus, the MIDP together with the Connected Limited Device Configuration (CLDC) provides a complete J2ME™ application runtime environment targeted to mobile information devices. A MIDlet is a Java application developed using the MIDP, and intended to be run on a mobile information device.

As processing capabilities, bandwidth, and other technologies improve, mobile information devices become more and more powerful and are capable of performing an increasing number of functions. Concurrently executing multiple applications (referred to as "multi-tasking") has become a standard feature of mobile information devices. For example, it is relatively common to concurrently execute a phone-call handling routine, game, and a phone-book application.

FIG. 1 depicts a resource-constrained device 100. Multi-tasking generally involves one central processing unit (CPU) 102 switching from one application to another quickly, thus, giving the appearance of concurrently executing all of the applications. A state of each application 104 in memory 106 must be maintained between application switching events. The states of platform independent applications 108, i.e. applications such as MIDlets under the control of the KVM, are maintained by the KVM 110. The states of native applications 112, i.e. applications under the control of the native OS 114 or native processing features of the CPU 102, are maintained by the OS 114 or native processing feature of the CPU 102.

An "event" encompasses actions initiated either by a user of a computer or internally generated by the computer. An example of a user event is any mouse movement, mouse click, keystroke, or a spoken word. An example of an internally generated event is a notification based on the time of day. If an event is passed to the KVM 110, a corresponding Java or native method (handler) is found and invoked. An event handler is generally a software routine that provides processing instructions for various events. For methods that are supposed to be frequently invoked, a mobile information device 100 can accomplish invoking frequently invoked applications using a special reference table. The applications can be registered in the table during implementation of a KVM 110.

Current software architectural technologies cannot be efficiently applied to embedded software development. Embedded software represents, for example, software applications that provide various basic services such as menu displays, phone-calling handling, and some standard games. Currently no mechanisms exist to allow a native application to run under control of the KVM. Any native application that should be executed while the KVM is running runs as a parallel process on the OS level. There will not be full resource sharing (or may not be sharing at all) and no control from the KVM side.

FIG. 2 depicts a conventional OS functionality addition methodology 200 for adding new functionality to an OS of a resource-constrained device such as a mobile phone when the OS does not support the functionality. In operation 202, if the OS supports the functionality and interpreter 204 is called, the function is provided by the resource-constrained device 100. In operation 202, if the OS does not support the new functionality, an OS programmer can choose in operation 206 whether or not to add functionality to the OS. The programmer can change the OS in operation 208, and the revised OS can then be installed in resource-constrained devices. During operation, the resource-constrained device then makes the new functionality available to a user through an interpreter call 204. Alternatively, if new functionality is not added to a new OS, in operation 210 a new operating system must be developed or purchased/licensed and integrated into each resource-constrained device as respectively depicted in operations 212 and 214. Once the new OS is installed, the new functionality is available via an interpreter call 204.

FIG. 3 depicts a conventional methodology 300 for providing an application to add external support functionality, such as statistics gathering support, to a virtual machine. Operation 302 stops the virtual machine execution. In operation 304, a person, such as a virtual machine programmer, adds/creates the new functionality inside the virtual machine, such as the KVM 110. Operation 306 builds and links the new virtual machine with the new functionality. In operation 308, the new virtual machine is downloaded to a constrained-resource device. Operation 310 starts the new virtual machine by, for example, activating the constrained-resource device. The constrained-resource device can now use the new functionality, e.g. the new statistics service, in operation 312. The methodology 300 cannot be implemented in a run-time environment. To disable the functionality implemented by methodology 300, the revised virtual machine is stopped and the old virtual machine is loaded.

FIG. 4 depicts a conventional methodology 400 for providing an application to add internal support functionality, such as a plug-in to support a new mobile phone, to a virtual machine. Operation 402 stops the virtual machine execution. In operation 404, a person, such as a virtual machine programmer, adds/creates a virtual machine function to provide native-type support for applications requesting native support. Operation 406 builds and links the new virtual machine with the new functionality. In operation 408, the new virtual machine is downloaded along with the plug-in to a constrained-resource device. Operation 410 starts the new virtual machine by, for example, activating the constrained-resource device. The constrained-resource device can now use the new functionality, e.g. the plug-in application, in operation 412. The methodology 400 cannot be implemented in a run-time environment.

Java programs can be written to include a portion written in a non-Java programming language to access functionality not yet supported in the Java technology, but which may be available in the underlying ("native") operating system or hardware. To do this, the Java technology includes a "Java Native Interface" (JNI). JNI is a standard Java API that acts as a link between the JVM and the platform-specific code included in a JAVA application to perform the particular operating-system function. JNI thus gives programmers a way to use native platform functionality with their Java-based software. However, conventional JAVA technology does not support JVM control over pure native applications.

Adding new OS and virtual machine functionality or choosing or creating a new OS can, thus, be expensive, time-consuming, and difficult to distribute to then-existing resource-constrained devices.

SUMMARY OF THE INVENTION

In one embodiment of the present invention, a resource-constrained device includes a processor and a memory, coupled to the processor, wherein the memory includes computer programs executable by the processor. The computer programs include an operating system to provide functions to native applications, a virtual machine, and one or more native applications under scheduling control of the virtual machine. Each native application is associated with an application context, and each application context at least (i) maps one or more services provided by the associated native application to an interface of the virtual machine and (ii) maintains a state of the associated native application.

In another embodiment of the present invention, a method extends capabilities of a virtual machine. The method allows the virtual machine to at least control scheduling of one or more native applications installed in a resource constrained device. An operating system provides function to each native application. The method includes, for each native application, mapping one or more services provided by the native application to an interface of the virtual machine through an application context associated with the native application. The method further includes, for each native application, maintaining a state of the native application in the application context associated with the native application.

In another embodiment of the present invention, a mobile information device includes a processor for processing computer program code and a memory, coupled to the processor. The memory includes computer programs executable by the processor. The computer programs include an operating system to provide functions to native applications and a virtual machine. The computer programs further include for each native application, means for mapping one or more services provided by the native application to an interface of the virtual machine through an application context associated with the native application and for each native application, means for maintaining a state of the native application in the application context associated with the native application.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a same or similar element.

DETAILED DESCRIPTION

Figure 1:
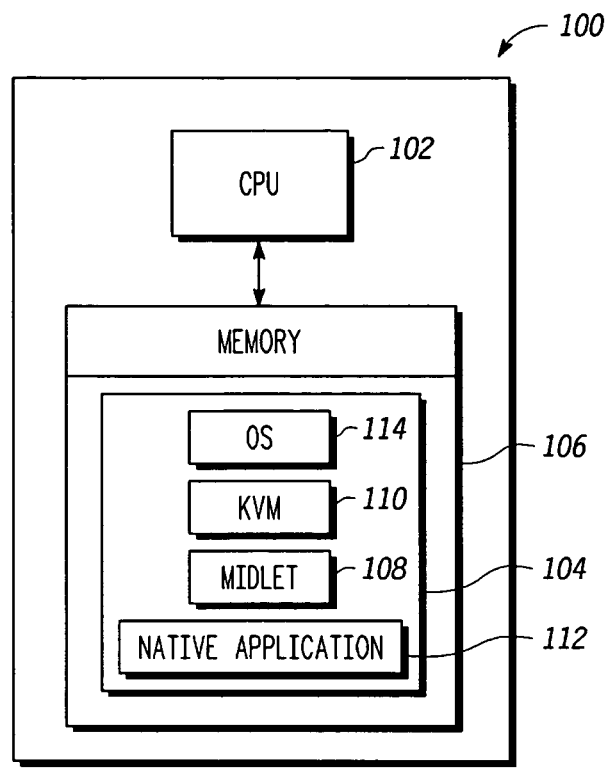
FIG. 1 (labeled prior art) depicts a resource-constrained device.
Figure 2:
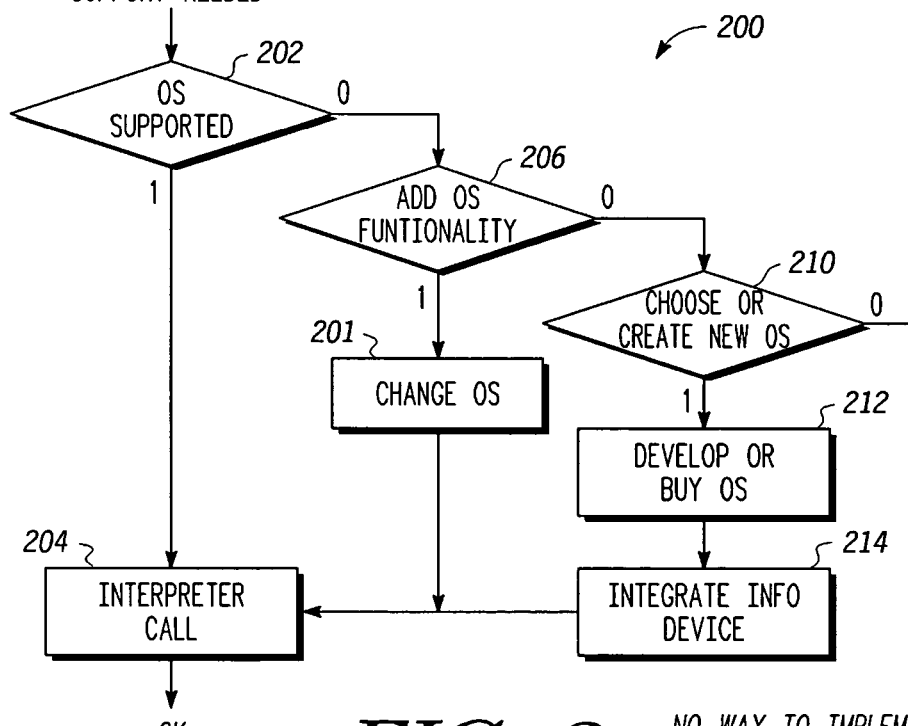
FIG. 2 (labeled prior art) depicts a conventional OS functionality addition approach for adding new functionality to a resource-constrained device.
Figure 3:
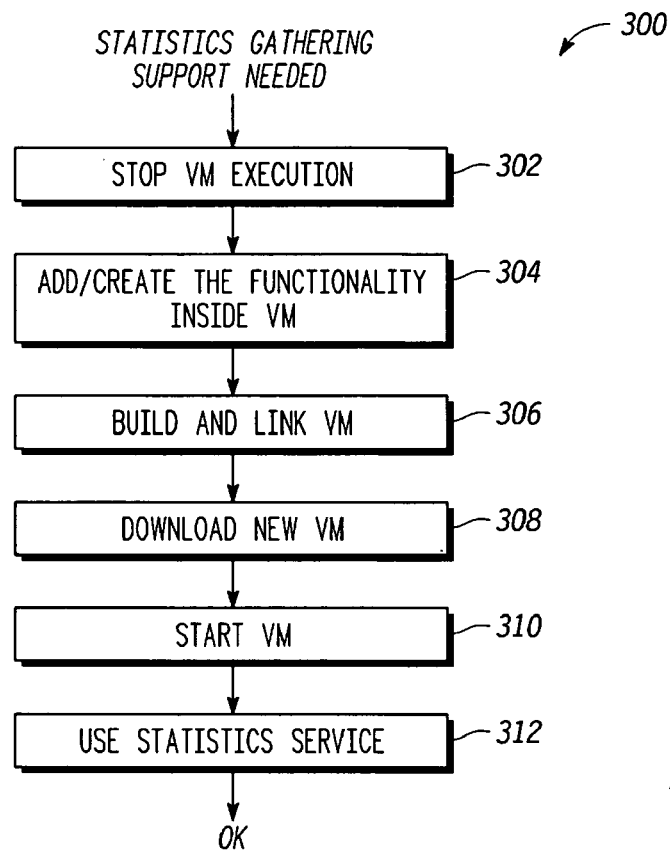
FIG. 3 (labeled prior art) depicts a conventional methodology for providing an application to add external support functionality to a virtual machine.
Figure 4:
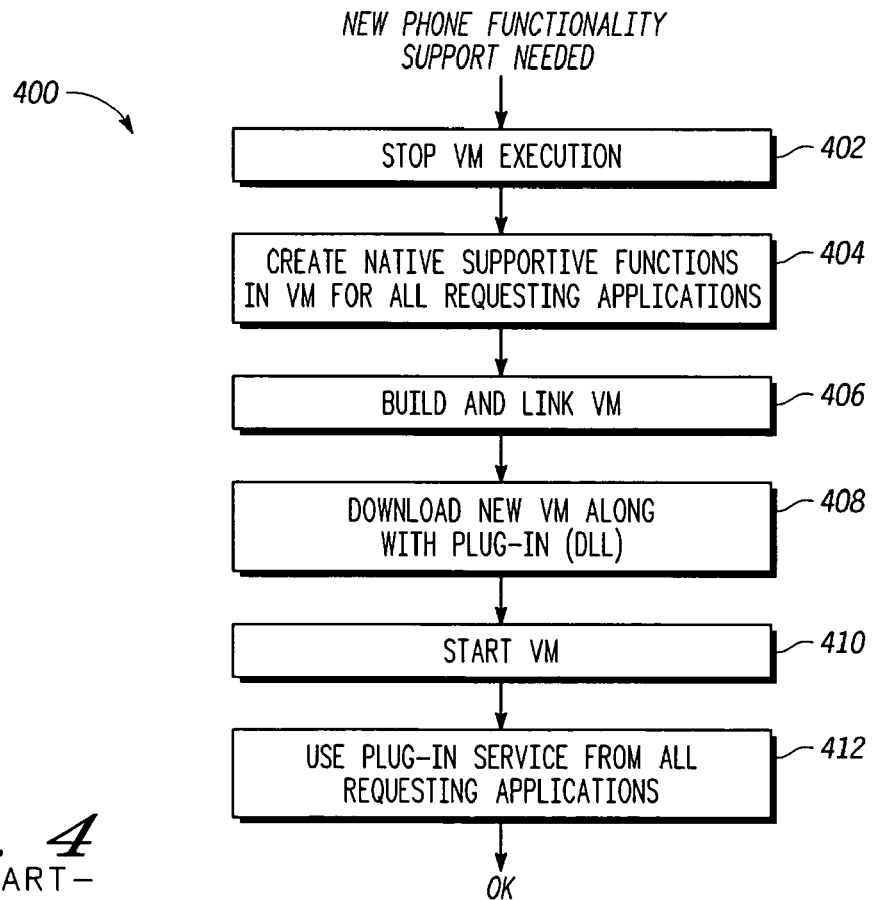
FIG. 4 (labeled prior art) depicts a conventional methodology for providing an application to add internal support functionality to virtual machine.

Despite the number of platform independent applications (e.g. Java applications) available for execution by a mobile information device executing a virtual machine, utilization of platform-dependent, native applications instead of or in conjunction with platform independent applications often remains desirable (e.g. performance (especially for interactive tasks) or security reasons). To increase the potential capability of a virtual machine, such as the Java Virtual Machine and KVM, a new virtual machine extension technology allows a developer or user to extend the functionality of a virtual machine without requiring development of a new virtual machine implementation or requiring subsequent virtual machine architectural changes. The new technology facilitates control by a virtual machine over both platform independent applications and native applications. The new technology utilizes new application contexts that include the ability to store information about a native application and allow a virtual machine to control the native application and the platform-independent application. The new technology is particularly useful for resource-constrained devices. In one embodiment, the new technology extends application program interfaces (APIs) of any native application and allows registration of the native application APIs with the virtual machine. Registration of the native application APIs can occur during run-time, thus, increasing the utility, distribution efficiency, and cost-effectiveness of providing new applications to resource-constrained devices.

Thus, a new approach to extending capabilities of virtual machines, such as KVM, provides an ability to easily extend functionality of virtual machines without internal changes to the virtual machine. This approach allows virtual machine functionality to accomplish new purposes, e.g. a newly introduced phone feature), and decrease development cycle time. This approach provides a way to improve the capabilities of consumer products, thus, making products more attractive for customers. Additionally this approach can be used in any personal mobile device that supports a virtual machine such as Java. More generally, this approach can be used for any platform-dependent and platform-independent applications for portable devices, especially for those that require fast execution. This approach is especially beneficial for resource-constrained devices.

Embodiments of the systems and methods utilize application contexts for extending virtual machines in a resource-constrained device. Application contexts can be assigned to each application in the system. An application is represented by one or more data structures and functions (also sometimes referred to as "methods"). In one embodiment, an "application context" includes an interface to a virtual machine and a container for an execution environment of the application. The interface represents a mapping of services to an execution environment. The application context can isolate control over the execution of the application from the execution environment, thus, allowing the virtual machine to control execution of the application and allowing the application to be executed in a native environment, a virtual machine environment, or any other execution environment. However, by maintaining control over the application, the application context allows native applications to be managed with shared resources from platform independent applications, such as Java applications. Thus, the virtual machine can be a service provider of any application regardless of language.

Figure 5:
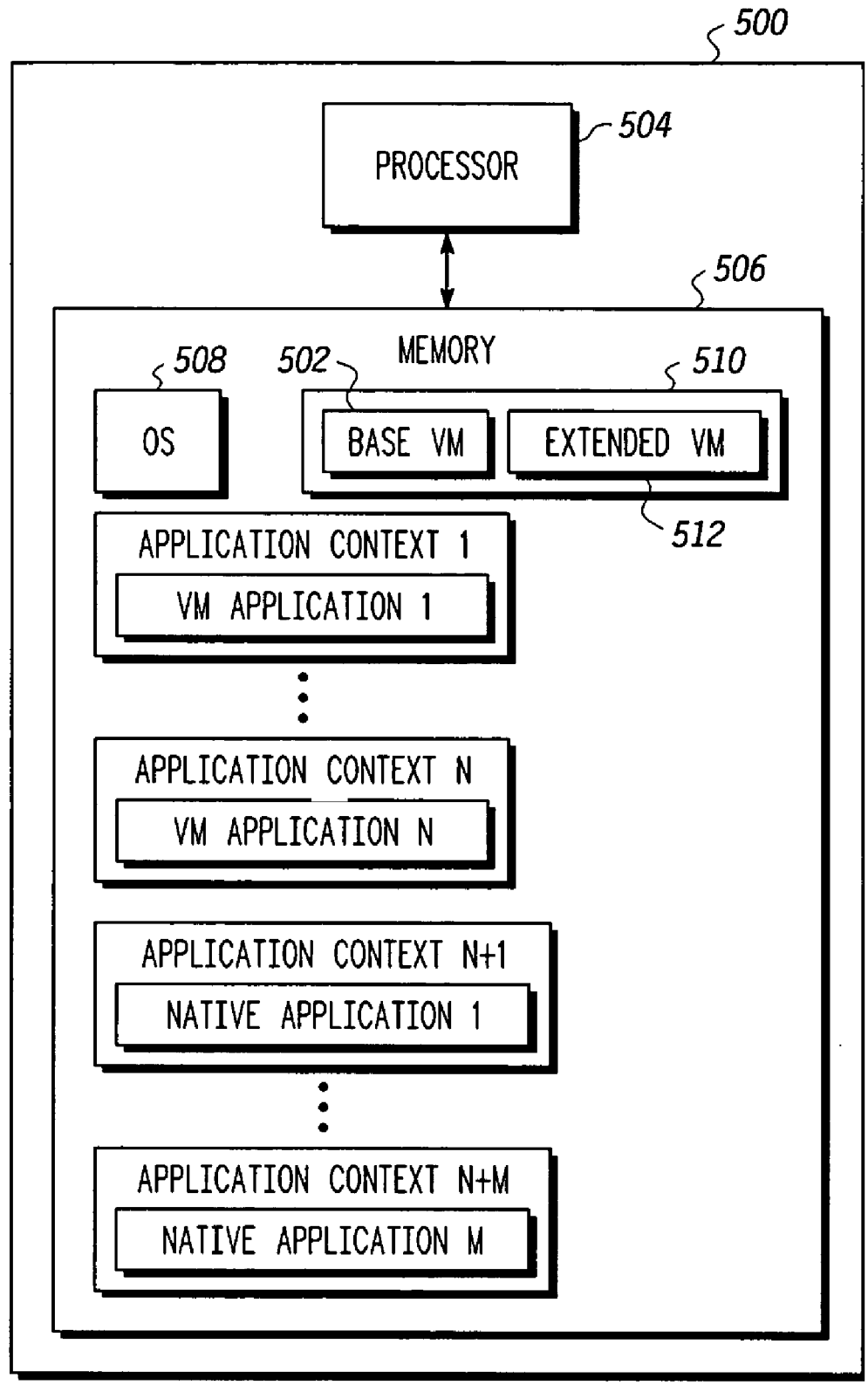
FIG. 5 depicts a resource-constrained device that includes application contexts for extending a base virtual machine.

FIG. 5 depicts a resource-constrained device 500 that includes application contexts for extending a base virtual machine 502. The resource-constrained device 500 includes a processor 504 that can write to and receive information from memory 506. The resource-constrained device 500 also includes features that are not shown such as a data input source, such as a keypad, a display, and a speaker. The resource-constrained device 500 can be any resource-constrained device such as a mobile information device. Mobile information devices include information communication devices such as mobile phones, pagers, and personal digital assistants. The memory 506 stores an operating system (OS) 508 and a virtual machine (VM) 510. The virtual machine is, for example, a kJava Virtual Machine (KVM). The memory 506 also stores N platform independent applications and M native applications, where N and M are respective numbers greater than or equal to zero. Each platform independent application and each native application is associated with an application context. Each application context is registered with the VM 510 to allow VM 510 to control execution of the application associated with the application context. The VM 510 includes data that defines the general form of each application context. An event dispatcher of the VM 510 maps the VM 510 services to the corresponding services of the application. The event dispatcher can be hard coded to include mapping data between known services of the VM 510 and applications to be executed by the resource-constrained device 500. In another embodiment, the event handler or other application is programmed to dynamically recognize VM 510 services and corresponding services of the application associated with the application context. The application can be programmed to alert the VM 510 of the type and names of services that will be needed by the VM 510 application context. Each application context includes an interface to the associated application that allows the virtual machine 510 to control operation of the associated application while concurrently allowing the application to operate in the execution environment of the application, e.g. KVM or OS. For example, a native environment of a platform independent application, such as a MIDlet, operates in a KVM environment, and a platform dependent native application supporting a new phone function operates in a native OS environment. The application context associated with the MIDlet and the application context associated with the new phone function native application allows the KVM to control operation of both the MIDlet and the new phone function native application. Although the KVM controls operation of the MIDlet and the native application, each application retains its respective execution environment. Additionally, in at least one embodiment, the native application can also share resources, such as fonts and other KVM resources, with the MIDlet. Application contexts provide the mapping of services (interfaces) to execution environments. Thus, native applications can be managed with shared resources with Java applications. Additionally, application contexts allow the VM to be a service provider of any application regardless of the application's execution environment.

By allowing the VM to be a service provider to any application, the VM can track (book keep) and maintain resource utilization across applications, thus the VM can be viewed as a resource itself providing management of resources to applications. By managing resources, the VM enables isolation between applications and, thus, can free resources, allocate, reuse, suspend, network connection sharing, etc. Accordingly, the VM can effectively manage resources in multiple environments.

Additionally, application contexts also facilitate extending the base VM 502 through extended VM functions 512. Application contexts simplify extensibility of the base VM 502 by allowing native and non-native applications to extend the VM through application contexts working within the inherent isolation framework of the VM architecture from execution environments. Thus, application functionality can be extended with new functionality of the VM 510 contained by application contexts. VM functionality can also be controlled with new functions also contained in application contexts.

The application contexts map entry points of native applications to entry points used by the VM to control an application. Entry points used by a VM are a matter of design choice and are often part of the public domain. For example, MIDP specifies several entry-points via which the VM application can be accessed. The entry points are usually tied to system events such as a key press and a move to foreground event. Any native application that has a corresponding set or subset of entry points can be used by the VM. Entry points are commonly defined in a description of an application's APIs.

Figure 6:
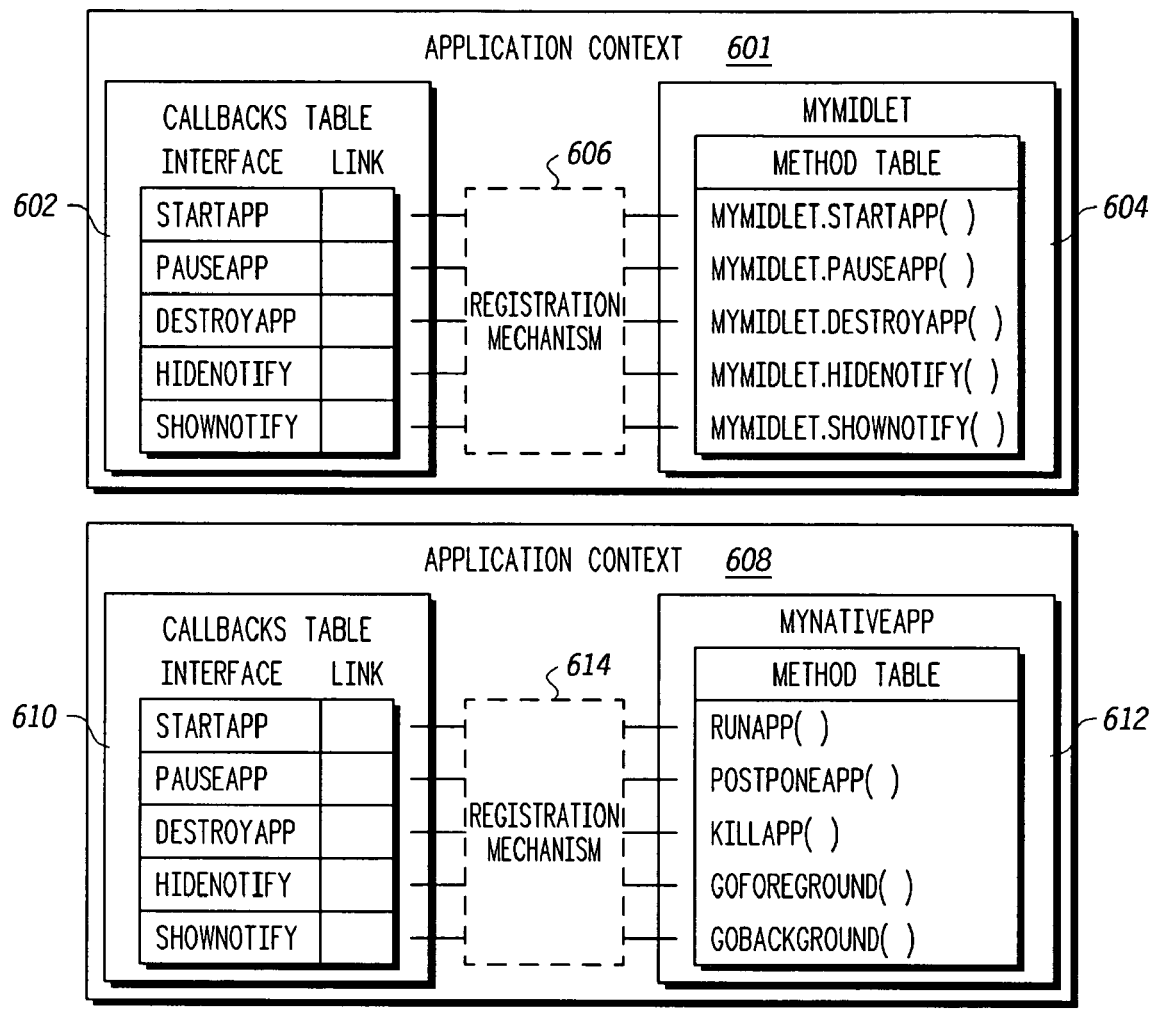
FIG. 6 depicts an example of application contexts for platform-independent and native applications.

FIG. 6 depicts an example of application contexts for platform-independent and native applications. Application context 601 depicts an example of an application context associated with a platform independent application, such as the MyMIDlet application. Application context 601 includes a Callbacks table 602 interface and a MyMIDlet method table 604. The Callbacks table 602 contains function call names that represent an interface used by VM 510 to control execution of the MyMIDlet application. The particular interface used by VM 510 to control application execution is a matter of design choice. In one embodiment, the VM 510 includes templates that contain entry points for MIDP compliant applications and for various native applications to be controlled by VM 510. In the embodiment of FIG. 6, the Callbacks Table 602 interface is defined by the set of the following self-described functions:

startApp
pauseApp
destroyApp
hideNotify
showNotify

The functions reflect functions defined in MIDP. The Callsback table 602 interface could also include an implementation-defined function or functions such as the function keyPressed that detects a key press. Application context 601 also wraps up the MyMIDlet application's methods in Method table 604:

MyMIDlet.StartApp( )
MyMIDlet.PauseApp( )
MyMIDlet.DestroyApp( )
MyMIDlet.HideNotify( )
MyMIDlet.ShowNotify( )

Registration mechanism 606 provides a link between the interface of Callsback table 602 and the MyMIDlet application functions in method table 604. The registration mechanism can be referred to as "registered callbacks".

Wrapping a MIDlet with an associated application context:
a. Easily solves concurrent MIDlet execution problem by separating states of MIDlets and allowing management of concurrency by the VM 510.
b. Provides separation between MIDlets and between a MIDlet and the VM 510 to provide an additional measure of security and safety.
c. Facilitates implementation of a new VM architecture which is entirely of native code in the form of services and management functions but without the need to understand Java bytecode execution.
d. Enables the VM 510 to provide ordinary operating system principles to MIDlets including priority scheduling and shared resource management giving MIDlets the illusion of a private machine.
e. Enables the VM 510 to be designed for preemptive and priority scheduling to add real time response in the VM execution environment.

Similarly, application context 608 depicts an example of an application context associated with a platform dependent, native application, such as the MyNativeApp application. Application context 608 includes a Callbacks table 610 interface and a MyNativeApp method table 612. The Callbacks table 610 contains function call names that represent an interface used by VM 510 to control execution of the MyNativeApp application. The particular interface used by VM 510 to control application execution is a matter of design choice. In the embodiment of FIG. 6, the Callbacks Table 610 interface is defined by the same set of self-described functions in Callbacks Table 601, namely:

startApp
pauseApp
destroyApp
hideNotify
showNotify

The Callsback table 610 interface could also include implementation-defined function or functions such as the function keyPressed that detects a key press. Application context 610 also wraps up the MyMIDlet application's methods in Method table 612:

runApp( )
postponeApp( )
killApp( )
goBackground( )
goForegroundApp( )

Thus, in the embodiment of FIG. 6, the VM 510 can exercise control over applications through the Callsback table interfaces by starting the application, pausing the application, killing the application, and moving the application display to the foreground or background.

Registration mechanism 614 provides a link between the interface of Callsback table 610 and the MyNativeApp application functions in method table 612.

Wrapping a native application with an interface accessible to VM 510:
a. Allows VM 510 to manage native applications as an equal of ordinary platform independent applications, such as MIDlets.
b. Allows a VM 510 to provide priority scheduling and shared resource management across Java and native applications.
c. Hides the fact an application is Java or native.

Mixing native and platform independent applications into a system controlled by VM 510:

a. Enables the appropriate language to be used to solve a problem.
b. Along with real time scheduling of an application context, allows the system designer to use native applications for managing execution time of critical system tasks.
c. Enables the virtual machine environment to be more useful on a device by solving time sensitive tasks.

In one embodiment, no internal structure of an application associated with (wrapped by) an application context is known outside of the associated application context. Thus, in this embodiment, the VM 510 has no information about information maintained within application contexts 601 and 608. The application contexts 601 and 608 maintain the respective application reference, current state, and some "runtime environment" shared resources such as thread identification (ID), display, current font, current displayable (the object to be displayed), and port ID of the associated application.

In run-time, the application contexts 601 and 608 decide how to execute the application associated with the respective application context. For a platform independent application, such as a MIDlet, the application context 601 runs an interpreter to interpret Java byte-code. For a platform dependent, native application the application context 608 can enter the function of an OS registered native application.

Figure 7:
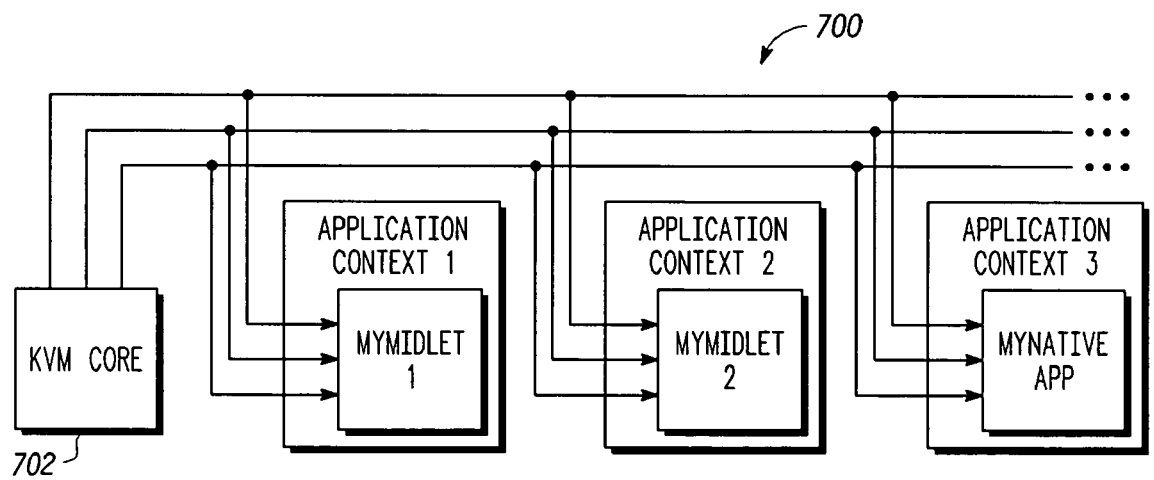
FIG. 7 depicts an example logical application context independency system.

FIG. 7 depicts one embodiment of a logical application context independency system 700. The system 700 depicts a virtual machine, such as KVM core 702 in communication with application contexts 1, 2 and 3. Application contexts 1 and 2 are associated with respective platform independent applications such as MyMIDlet 1 and MyMIDlet 2, respectively. Application context 3 is associated with a platform dependent application, such as MyNativeApp. The application contexts 1, 2 and 3 each allow the KVM core 702 to communicate with each wrapped application, i.e. the application associated with a particular application context, via an interface such as a Callbacks table. Each application context has no information about other application contexts and is independent of other application contexts.

Application contexts provide extensibility to a virtual machine. For example, a VM interface to external applications, as for example represented by Callbacks tables 602 and 610, may not comprehensively match the native application abilities. For example, a native application may have entry points such as the self-described entry points: killProcess( ) or closeAll( ), that have no virtual machine external interface counterpart. However, the VM interface can be easily extended to allow registration (linking) of the VM entry points in the application context to entry points of any native application to facilitate incorporation of any native application into the system 700. Extension of the VM interface can be accomplished through a broadcast update of the VM interface or by hard coding the VM interface for new devices. The application contexts supporting VM control over applications can be created by the VM dynamically. The KVM core 702 will not be affected by such extensions, and, thus, extending the KVM core 702 capability to control any native application can be accomplished in a run-time environment. Each application, such as MyMIDlet and MyNativeApp are logically unaware of other applications. Thus, adding a new application to the set of applications in system 700 or changing behavior of an application does not directly affect other application members of system 700. In one embodiment, only KVM core 702 is responsible for controlling applications through state changing/tracking, task switching, critical resource allocating etc. For example, background/foreground task switching is a special case of resource granting mechanism: Display (or off-screen buffer) is an example of a "critical resource". A "state machine" concept can be used internally to provide consistent states of the application list and applications themselves.

Figure 8:
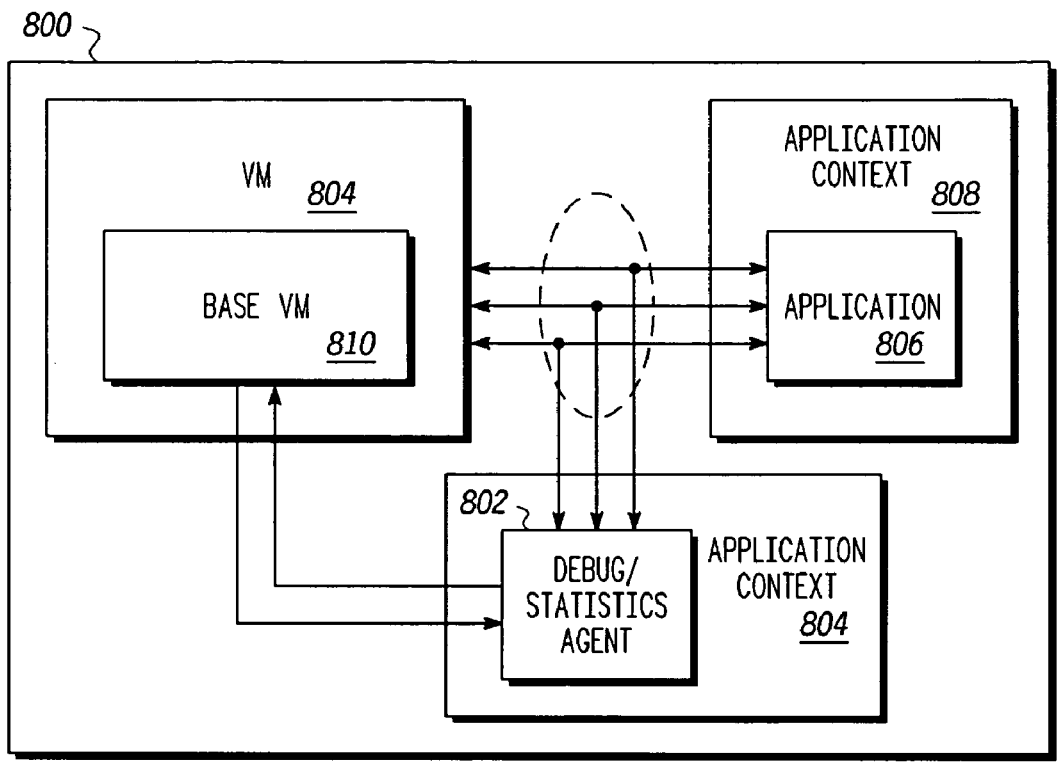
FIG. 8 depicts an example extended virtual machine system that includes applications and associated application contexts.

FIG. 8 depicts an example extended VM system 800 that includes a native Debug/Statistics Agent native application 802 with an application context 804 that allows the VM 804 to control native application 802. The application 806 is associated with application context 808 that allows VM 804 to control application 806. The Debug/Statistics Agent native application 802 gathers information about application 806 without impacting the operation of VM 804. Thus, the native application 802 extends the functionality of base VM 810.

Figure 9:
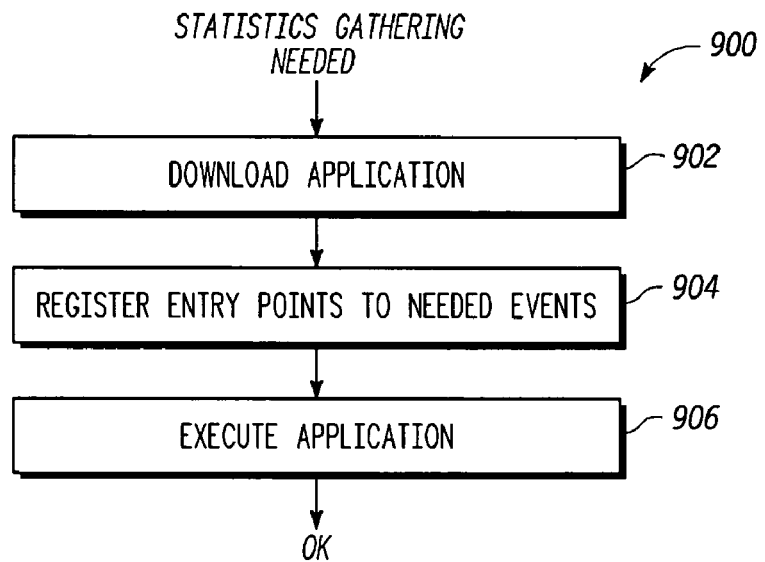
FIG. 9 depicts an application registration process to allow control of the application by a virtual machine.

FIG. 9 depicts an application registration process 900 for adding an application to system 800 to facilitate control over the application by a virtual machine. Operation 902 downloads an application, such as the native application 802 to a device such as resource-constrained device 500. In operation 904, VM 804 generates an application context for the downloaded application and entry points are registered with the application context to allow the VM 804 to control the downloaded application. In operation 906, the VM 804 allows the downloaded application to execute under the control of the VM 804.

In general, from a security standpoint, native applications are more trusted by a system than platform independent applications such as MIDlets. Access by an application to system functions can be limited using access-layers. The access-layer defines function sets that can be accessed by applications. An example of an access-layer is a trusted layer: File System advanced package tool (APT) is available; execution of application program interface (API) push function. Another example of an access-layer is a non-trusted layer: only viewing and picturing functions are available.

Figure 10:
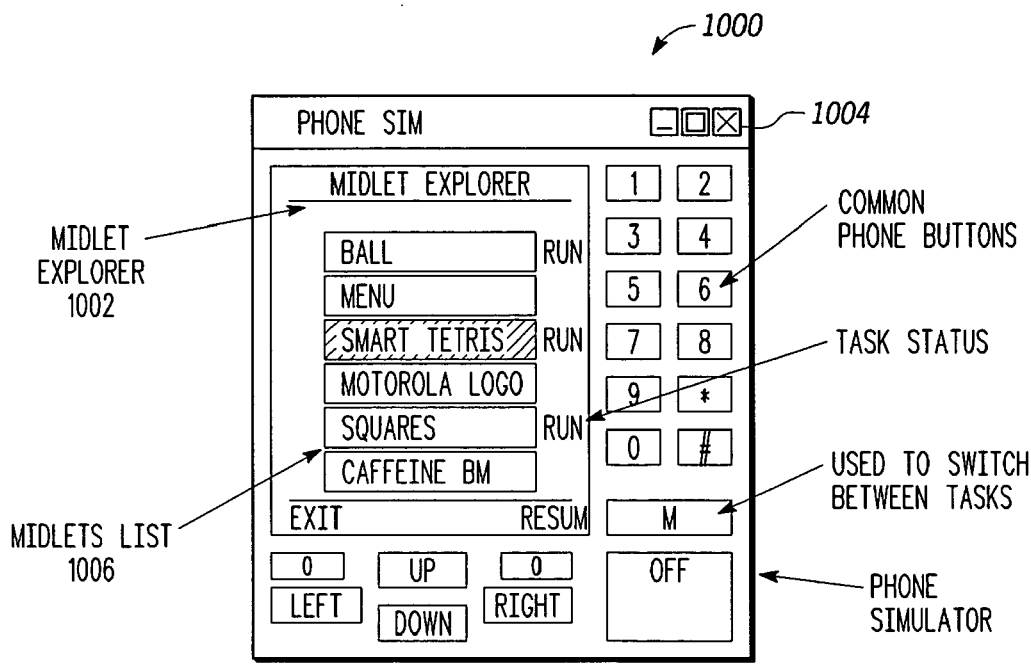
FIG. 10 depicts an example of a native application generating a user interface under the control of a virtual machine.

FIG. 10 depicts an example of a native application (MIDlet eXplorer) 1002 generating a user interface 1004 executing on a simulated resource constrained mobile phone system 1000. Note, MIDlets are MIDP based applications and, initially, are not platform dependant. However, the functionality of a MIDlet can be extended by a set of native functions (called from Java functions) by the implementation of a VM, thus, transforming the MIDlet to a native application. The MIDlet eXplorer represents one embodiment of a native application.

The native application is written in the C programming language and is wrapped by an associated application context. Additionally platform independent applications represented by MIDlets, such as MIDlets list applications 1006, are also installed in the system 1000 and wrapped by respective application contexts. In at least one embodiment, dynamic application management provides the ability to add or remove applications from the MIDlets list applications 1006. Native application MIDlet eXplorer 1002 is running under KVM control and shares resources like fonts and display buffer with the platform independent applications (MIDlets) 1006. When MIDlet eXplorer 1002 goes foreground, MIDlet eXplorer 1002 draws the list of applications and returns control to the KVM. When a button on the phone simulator (device) is selected, the KVM invokes a corresponding callback of MIDlet eXplorer 1002 (while MIDlet eXplorer 1002 is in the foreground). When control is returned to the KVM, the KVM interprets the bytecodes of executing platform independent MIDlets. A current view of a running platform independent MIDlet application can be viewed using a command-button presented by the MIDlets list application 1006. A hotkey "M" can be used to return to the display depicted in FIG. 10.

Figure 11:
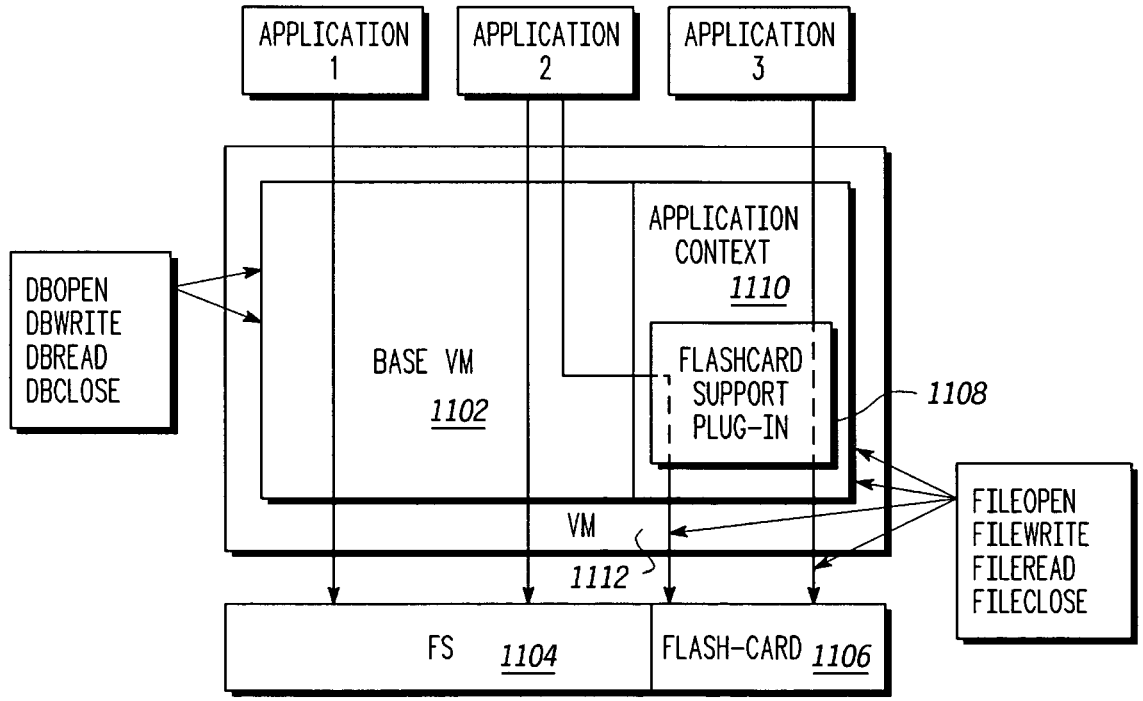
FIG. 11 depicts extending a base VM using an auxiliary application, such as a plug-in, wrapped by an application context.
Figure 12:
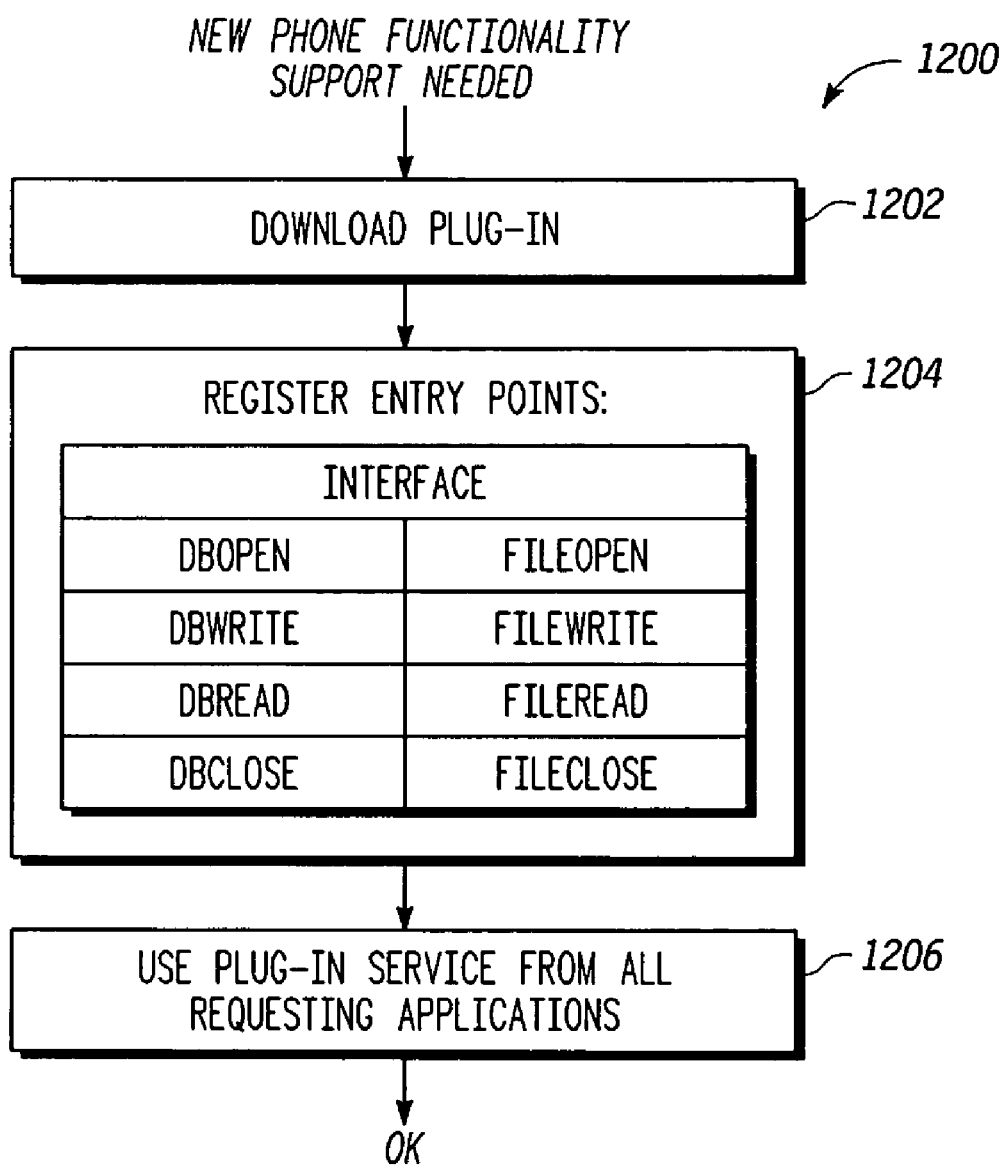
FIG. 12 depicts a base VM extension process for extending a base VM.

FIG. 11 depicts extending a base VM using an auxiliary application, such as a virtual machine plug-in, wrapped by an application context. FIG. 12 depicts a base VM extension process 1200 for extending a base VM. Applications 1 and 2 use the functionality of base VM 1102. VM 1102 allows applications 1 and 2 to access a conventional file system 1104. By inserting flash-card 1106, it is possible to extend persistent memory volume. Assuming that the base VM 1102 does not support allowing applications to access the flash-card 1106, operation 1202 downloads the flash-card support plug-in 1108. If a needed form of an application context is not represented in the system, an application context 1110 can be generated by a submodule of VM 1102 to allow the base VM 1102 to exercise control over the plug-in 1108. From a logical viewpoint and an external view perspective, the base VM 1102 and the plug-in 1108 collectively form VM 1112. In generating the application context, operation 1204 registers entry points using a Callbacks table. The base VM 1102 includes the self-described functions dbOpen, dbWrite, dbRead, and dbClose. The corresponding functions available from the plug-in 1108 are FileOpen, FileWrite, FileRead, and FileClose, respectively. The Callbacks table maps the functions between the base VM 1102 and the plug-in 1108 to enable the base VM 1102 to exercise control over the plug-in 1108. Thus, in operation 1206 applications requesting to write to flash-card 1106, such as application 2 and application 3, are supported by VM 1112 and can use the services of plug-in 1108. Unlike conventional technology, process 1200 is applicable in run-time.

Thus, although traditional technology of a Java Virtual Machine doesn't suppose native application execution inside, the virtual machine extensions facilitated by application contexts extend the functionality of virtual machines, such as the KVM, to the extend desired. Usage of native applications can resolve problems related to execution speed for some critical issues. Application contexts provide a particularly useful solution for resource-constrained devices. No memory or processing overhead required. Some advantages of one or more embodiments of application contexts and virtual machine control over platform independent and native applications are:

- improved flexibility and extensibility of virtual machines;
- resource savings for other applications relative to conventional systems, because of resource sharing between native applications and platform independent applications;
- ability to execute almost any native application for different purposes in the system;
- extensibility of functionality can provided with no architectural changes;
- ability to extend the functionality of the virtual machine in run-time either such as through downloading a new functional block over the Internet or through wireless communication networks into a mobile device;
- native modules can be plugged or unplugged depend on user (developer) wishes;
- ability to introduce special purpose native applications that use the functionality (or internal VM structures), that are not within the functional scope of available platform independent applications;
- interfaces are unified and simplified;
- the VM can have functions defined within contexts to provide a more scalable system;
- the application context can be used as a unit of download;
- VM functionality implemented in auxiliary applications, such as plug-ins, contained in contexts can be downloaded only when needed and omitted to meet product tier requirements; and
- VM is extensible to new and unforeseen functionality.

Although the present invention has been described in detail, it should be understood that various changes, substitutions and alterations can be made hereto without departing from the spirit and scope of the invention as defined by the appended claims.

What is claimed is:

1. A resource-constrained device comprising:
  a processor;
  a memory, coupled to the processor, wherein the memory includes computer programs executable by the processor, wherein the computer programs comprise:
    an operating system to provide functions to native applications;
    a virtual machine;
    one or more native applications under scheduling control of the virtual machine, wherein each native application is associated with an application context, each application context at least (i) maps one or more services provided by the associated native application to one or more corresponding services of the virtual machine and (ii) maintains a state of the associated native application; and
  one or more platform independent applications executable by the virtual machine;
  wherein one or more of the native applications and one or more of the platform independent applications share resources available from the virtual machine.

2. The resource-constrained device of claim 1 wherein each application context comprises program code to (i) isolate internal programming functions of the associated native application from programs external to the associated native application and (ii) to determine an execution environment of the associated native application.

3. The resource-constrained device of claim 1
  wherein each platform independent application is associated with an application context, and each application context at least (i) maps one or more services provided by the associated platform independent application to an interface of the virtual machine and (ii) maintains a state of the associated platform independent application.

4. The resource-constrained device of claim 3 wherein the platform independent applications are members of the group comprising a MIDlet application and a virtual machine plug-in application.

5. The resource-constrained device of claim 1 wherein the shared resources include one or more members of the group comprising: fonts, display, and thread identification data.

6. The resource-constrained device of claim 1 wherein the native applications are not executable by the virtual machine.

7. The resource-constrained device of claim 1 wherein the virtual machine comprises a self-contained operating environment.

8. The resource-constrained device of claim 1 wherein the resource-constrained device is a mobile information device.

9. The resource-constrained device of claim 8 wherein the mobile information device is selected from the group comprising: cellular telephones, pagers, and personal digital assistants.

10. A method comprising:
  extending capabilities of a virtual machine to allow the virtual machine to at least control scheduling of one or more native applications installed in a resource constrained device, wherein an operating system provides functions to each native application, and extending capabilities of the virtual machine further comprises:

for each native application, mapping one or more services provided by the native application to one or more corresponding services of the virtual machine through an application context associated with the native application; and for each native application, maintaining a state of the native application in the application context associated with the native application;

wherein the native applications are not executable by the virtual machine and the virtual machine comprises a self-contained operating environment.

11. The method of claim 10 further comprising:

isolating internal programming functions of each native application associated with an application context from programs external to the associated native application;

determining an execution environment of each native application associated with an application context.

12. The method of claim 10 further comprising:

mapping one or more services provided by a platform independent application to an interface of the virtual machine through an application context associated with the native application, and maintaining a state of the platform independent application in the application context associated with the platform independent application.

13. The method of claim 12 further comprising:

sharing resources of the virtual machine with each platform independent application associated with an application context and each native application associated with an application context.

14. The method of claim 13 wherein the shared resources include one or more members of the group comprising: fonts, display, and thread identification data.

15. The method of claim 10 wherein the resource-constrained device is a mobile information device.

16. The method of claim 15 wherein the mobile information device is selected from the group comprising: cellular telephones, pagers, and personal digital assistants.

17. A mobile information device comprising:

a processor for processing computer program code;

a memory, coupled to the processor, wherein the memory includes computer programs executable by the processor, wherein the computer programs comprise:

an operating system to provide functions to native applications;

a virtual machine; and for each native application, means for mapping one or more services provided by the native application to one or more corresponding services of the virtual machine through an application context associated with the native application; and for each native application, means for maintaining a state of the native application in the application context associated with the native application;

wherein the native applications are not executable by the virtual machine and the virtual machine comprises a self-contained operating environment.

18. A resource-constrained device comprising:

a processor;

a memory, coupled to the processor, wherein the memory includes computer programs executable by the processor, wherein the computer programs comprise:

an operating system to provide functions to native applications;

a virtual machine; and one or more native applications under scheduling control of the virtual machine, wherein each native application is associated with an application context, each application context at least (i) maps one or more services provided by the associated native application to one or more corresponding services of the virtual machine and (ii) maintains a state of the associated native application, and each application context comprises program code to (i) isolate internal programming functions of the associated native application from programs external to the associated native application and (ii) to determine an execution environment of the associated native application.

19. A resource-constrained device comprising:

a processor;

a memory, coupled to the processor, wherein the memory includes computer programs executable by the processor, wherein the computer programs comprise:

an operating system to provide functions to native applications;

a virtual machine;

one or more native applications under scheduling control of the virtual machine, wherein each native application is associated with an application context, and each application context at least (i) maps one or more services provided by the associated native application to one or more corresponding services of the virtual machine and (ii) maintains a state of the associated native application; and one or more platform independent applications executable by the virtual machine, wherein each platform independent application is associated with an application context, and each application context at least (i) maps one or more services provided by the associated platform independent application to an interface of the virtual machine and (ii) maintains a state of the associated platform independent application.

20. A resource-constrained device comprising:

a processor;

a memory, coupled to the processor, wherein the memory includes computer programs executable by the processor, wherein the computer programs comprise:

an operating system to provide functions to native applications;

a virtual machine; and one or more native applications under scheduling control of the virtual machine, wherein each native application is associated with an application context, each application context at least (i) maps one or more services provided by the associated native application to one or more corresponding services of the virtual machine and (ii) maintains a state of the associated native application, the native applications are not executable by the virtual machine, and the virtual machine comprises a self-contained operating environment.

21. A method comprising:

extending capabilities of a virtual machine to allow the virtual machine to at least control scheduling of one or more native applications installed in a resource constrained device, wherein an operating system provides functions to each native application, and extending capabilities of the virtual machine further comprises:

for each native application, mapping one or more services provided by the native application to one or more corresponding services of the virtual machine through an application context associated with the native application, and for each native application, maintaining a state of the native application in the application context associated with the native application;

wherein each application context comprises program code to (i) isolate internal programming functions of the associated native application from programs external to the associated native application and (ii) to determine an execution environment of the associated native application.

22. A method comprising:

extending capabilities of a virtual machine to allow the virtual machine to at least control scheduling of one or more native applications installed in a resource constrained device, wherein an operating system provides functions to each native application, and extending capabilities of the virtual machine further comprises:

for each native application, mapping one or more services provided by the native application to one or more corresponding services of the virtual machine through an application context associated with the native application;

for each native application, maintaining a state of the native application in the application context associated with the native application; and one or more platform independent applications executable by the virtual machine, wherein each platform independent application is associated with an application context, and each application context at least (i) maps one or more services provided by the associated platform independent application to an interface of the virtual machine and (ii) maintains a state of the associated platform independent application.

23. A method comprising:

extending capabilities of a virtual machine to allow the virtual machine to at least control scheduling of one or more native applications installed in a resource constrained device, wherein an operating system provides functions to each native application, and extending capabilities of the virtual machine further comprises:

for each native application, mapping one or more services provided by the native application to one or more corresponding services of the virtual machine through an application context associated with the native application, and for each native application, maintaining a state of the native application in the application context associated with the native application;

wherein one or more of the native applications and one or more platform independent applications share resources available from the virtual machine.

24. A mobile information device comprising:

a processor for processing computer program code;

a memory, coupled to the processor, wherein the memory includes computer programs executable by the processor, wherein the computer programs comprise:

an operating system to provide functions to native applications;

a virtual machine; and for each native application, means for mapping one or more services provided by the native application to one or more corresponding services of the virtual machine through an application context associated with the native application, and for each native application, means for maintaining a state of the native application in the application context associated with the native application;

wherein each application context comprises program code to (i) isolate internal programming functions of the associated native application from programs external to the associated native application and (ii) to determine an execution environment of the associated native application.

25. A mobile information device comprising:

a processor for processing computer program code;

a memory, coupled to the processor, wherein the memory includes computer programs executable by the processor, wherein the computer programs comprise:

an operating system to provide functions to native applications;

a virtual machine; and for each native application, means for mapping one or more services provided by the native application to one or more corresponding services of the virtual machine through an application context associated with the native application;

for each native application, means for maintaining a state of the native application in the application context associated with the native application; and one or more platform independent applications executable by the virtual machine, wherein each platform independent application is associated with an application context, and each application context at least (i) maps one or more services provided by the associated platform independent application to an interface of the virtual machine and (ii) maintains a state of the associated platform independent application.

26. A mobile information device comprising:

a processor for processing computer program code;

a memory, coupled to the processor, wherein the memory includes computer programs executable by the processor, wherein the computer programs comprise:

an operating system to provide functions to native applications;

a virtual machine; and for each native application, means for mapping one or more services provided by the native application to one or more corresponding services of the virtual machine through an application context associated with the native application; and for each native application, means for maintaining a state of the native application in the application context associated with the native application;

wherein one or more of the native applications and one or more platform independent applications share resources available from the virtual machine.

* * * * *